US010007546B2

(12) United States Patent
Gunti et al.

(10) Patent No.: US 10,007,546 B2
(45) Date of Patent: Jun. 26, 2018

(54) OPERATING-SYSTEM EXCHANGES USING MEMORY-POINTER TRANSFERS

(71) Applicants: Mukund Gunti, Sunnyvale, CA (US); Vishnu Sekhar, Sunnyvale, CA (US); Rajesh Venkatasubramanian, San Jose, CA (US)

(72) Inventors: Mukund Gunti, Sunnyvale, CA (US); Vishnu Sekhar, Sunnyvale, CA (US); Rajesh Venkatasubramanian, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 146 days.

(21) Appl. No.: 15/189,130

(22) Filed: Jun. 22, 2016

(65) Prior Publication Data

US 2016/0306649 A1   Oct. 20, 2016

Related U.S. Application Data

(63) Continuation-in-part of application No. 14/642,656, filed on Mar. 9, 2015.

(Continued)

(51) Int. Cl.
*G06F 9/44* (2018.01)
*G06F 9/455* (2018.01)
(Continued)

(52) U.S. Cl.
CPC .......... *G06F 9/45558* (2013.01); *G06F 8/656* (2018.02); *G06F 9/4406* (2013.01);
(Continued)

(58) Field of Classification Search
CPC ................ G06F 7/78; G06F 8/00–8/78; G06F 9/44–9/455; G06F 11/36
See application file for complete search history.

(56) References Cited

U.S. PATENT DOCUMENTS 6,961,941 B1    11/2005   Nelson et al.
7,814,495 B1 *  10/2010   Lim ..................... G06F 9/45558
                                                    717/168
(Continued)

FOREIGN PATENT DOCUMENTS

WO    WO 2014/149583    9/2014

OTHER PUBLICATIONS

Chen et al., Live Updating Operating Systems Using Virtualization, 2006 (Year: 2006).*
(Continued)

*Primary Examiner* — S. Sough
*Assistant Examiner* — Zhan Chen
(74) *Attorney, Agent, or Firm* — Clifton Leon Anderson

(57) ABSTRACT

An "old" hypervisor is upgraded to or otherwise replaced by a "new" hypervisor without migrating virtual machines to a standby computer. The old hypervisor partitions the computer that it controls between a source partition and a target partition. The hypervisor and its virtual machines initially run on the source partition, while a new hypervisor is installed on the target partition. The virtual machines are migrated to the new hypervisor without physically moving the in-memory virtual-machine data. Instead, the old hypervisor sends memory pointers, and the new hypervisor claims the respective memory locations storing the virtual-machine data. After all virtual machines are migrated, the old hypervisor bequeaths the hypervisor memory and a last processor that the old hypervisor requires to run. The new hypervisor claims the bequeathed processor and hypervisor memory after the old hypervisor terminates to complete the upgrade/exchange.

16 Claims, 10 Drawing Sheets

Related U.S. Application Data

(60) Provisional application No. 62/105,128, filed on Jan. 19, 2015.

(51) Int. Cl.
*G06F 9/4401* (2018.01)
*G06F 8/656* (2018.01)

(52) U.S. Cl.
CPC ............... *G06F 2009/4557* (2013.01); *G06F 2009/45575* (2013.01); *G06F 2009/45583* (2013.01)

(56) References Cited

U.S. PATENT DOCUMENTS

| | | | |
|---|---|---|---|
| 7,818,726 B2 | 10/2010 | Snover et al. | |
| 8,181,007 B2 | 5/2012 | Liu | |
| 2006/0242442 A1* | 10/2006 | Armstrong | G06F 1/14 713/400 |
| 2008/0184373 A1* | 7/2008 | Traut | G06F 9/45533 726/26 |
| 2010/0125845 A1* | 5/2010 | Sugumar | G06F 9/5088 718/1 |
| 2012/0017031 A1* | 1/2012 | Mashtizadeh | G06F 9/45558 711/6 |
| 2013/0263118 A1 | 10/2013 | Kannan et al. | |
| 2014/0019968 A1 | 1/2014 | Deng et al. | |
| 2014/0149635 A1* | 5/2014 | Bacher | G06F 9/45558 711/6 |
| 2014/0282539 A1 | 9/2014 | Sonnek | |
| 2015/0169329 A1* | 6/2015 | Barrat | G06F 8/67 713/2 |
| 2015/0324227 A1* | 11/2015 | Sizemore | G06F 9/48 718/1 |
| 2016/0026489 A1* | 1/2016 | Maislos | G06F 9/45558 718/1 |

OTHER PUBLICATIONS

Brasser et al., Swap and Play Live Updating Hypervisors and Its Application to Xen, 2014 (Year: 2014).*

* cited by examiner

OPERATING-SYSTEM EXCHANGES USING MEMORY-POINTER TRANSFERS

This application is a continuation-in-part (CIP) of copending U.S. patent application Ser. No. 14/642,656 filed 2015 Mar. 11 and claims the benefit of its filing date. This application also claims the filing date of U.S. Provisional Patent Application 62/105,128, filed 2015 Jan. 19, of which this CIP's parent application is a non-provisional.

BACKGROUND

Upgrading hypervisors typically involves rebooting the underlying machine from the pre-upgrade version to the post update version. Any virtual machines running on the hypervisor are interrupted during the rebooting. To minimize such interruptions, the virtual machines can be migrated to a standby machine (e.g., using vMotion, available from VMware, Inc.) so that the virtual machines can continue executing during the upgrade. If the standby machine is running the upgraded version of the hypervisor, then the migrated virtual machines can remain there. Otherwise, the migrated virtual machines can be returned to the original machine once it is upgraded. However, if the collective size of the virtual machines is large, the migration(s) can take an undesirably long time. Furthermore, the required standby machine is not always available. Similar problems apply to upgrading of operating systems other than hypervisors.

DETAILED DESCRIPTION

Figure 1:
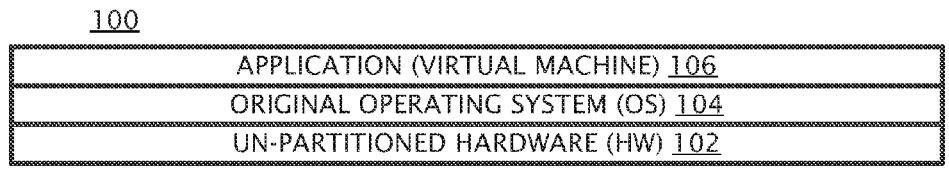
FIG. 1 is a schematic diagram of a computer prior to implementation of an upgrade process.

The parent patent application for this continuation-in-part patent application teaches how to update/upgrade a hypervisor or other operating system without migrating virtual machines or other applications off the machine controlled by the hypervisor. The process involves partitioning the machine so that the pre-upgraded hypervisor and its resident virtual machines are all on a source partition. An updated version of the hypervisor is installed on a target partition; the virtual machines are migrated from the source partition to the target partition. Resources, e.g., processors, memory, and other devices) associated with the first partition are transferred to or otherwise claimed by the target partition. At that point, the target partition possesses all of the machine's resources, so the update is complete.

Techniques for migrating virtual machines between computer machines can be used to migrate between partitions of a machine. For example, if the machine has redundant network interface cards (NICs), they can be used to form a network channel between the partitions over which virtual-machine data can be transferred. However, if the aggregate size of the virtual machines is great, the transfer could be very time consuming.

Accordingly, the present invention provides for sending information identifying the memory locations of virtual-machine data rather than physically moving the contents of those locations. The target partition can then just claim those memory locations to effect a logical transfer of the memory contents. The amount of data physically transferred between partitions is reduced by orders of magnitude, as is the time required for the transfer. The memory locations can be defined in terms of page addresses or memory ranges. Collectively, information identifying memory locations is referred to as "memory pointers" herein; for example, memory-page addresses are memory pointers. Furthermore, as an alternative to transferring the memory pointers over a network connection, the present invention provides for sending the memory pointers (e.g., lists of freed memory pages) over shared memory. Sending via shared memory can be faster than network transfers and obviates the need for redundant NICs.

The source and target hypervisors can cooperate to migrate virtual machines and to transfer resources including processors, memory, and other devices, as well as the virtual machines. Of course, the old hypervisor needs at least one processor and some "hypervisor" memory to perform its role in the transfer. Thus, there is a challenge to (logically) transfer the last processor and the last remaining hypervisor memory. In one realization of the invention, the hypervisor prepares a "do not open until I terminate" list of the remaining memory locations. The source partition shuts its last processor down. The target partition reads the list, claims the last remaining memory and the processor. In addition, the target partition reinitializes and claims for its own use what was shared memory. This completes the hypervisor upgrade or other exchange.

The following discussion is adapted from parent application Ser. No. 14/642,656 filed 2015, Mar. 11 and refers to FIGS. 1-8B to provide a context for the present invention. The improvements are discussed with respect to FIGS. 9A-D, further below.

Figure 3:
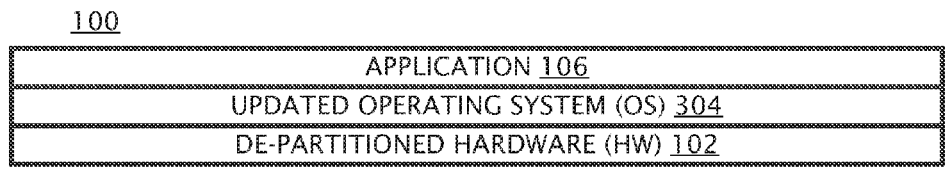
FIG. 3 is a schematic diagram of the computer of FIG. 1 after implementation of the upgrade process.

As shown in FIG. 1, an initially un-partitioned computer 100 includes hardware 102 prior to it being partitioned, an original bare-metal operating-system (OS) instance 104 executing on and controlling hardware 102, and an application 106 executing on original OS instance 104. As shown in FIG. 3, subsequently de-partitioned computer 100 includes hardware 102 after a partition has been removed, an updated bare-metal OS instance 304 executing on hardware 102, and application 106 executing on updated operating system 304. In effect, updated OS instance 304 has been "swapped" for the original OS instance 104. The swapping is "hot" in that it is achieved without shutting down or rebooting hardware 102. As a result, application downtime is minimized.

Figure 2:
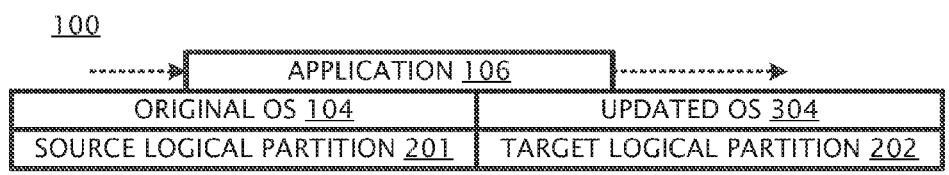
FIG. 2 is a schematic diagram of the computer of FIG. 1 during a migration of an application in the course of the update process.

Computer 100 is shown logically partitioned in FIG. 2 at a time intermediate between the times respectively represented in FIGS. 1 and 3. Hardware 102 has been logically partitioned to define a "source" logical partition 201 and a "target" logical partition 202. Original (old) OS instance 104 is executing on logical partition 201, while updated (new) OS instance 304 is executing on logical partition 202. In other words, original OS instance 104 and updated OS instance 304 are executing in parallel on hardware 102, the same hardware that was formerly exclusively controlled by original OS 104. The ability to run two operating-system instances directly (as opposed to within virtual-machine instances) on the hardware that normally supports one OS instance enables updating an OS without a hardware reboot or a transfer of an application to another computer. In FIG. 2, application 106 is in the process of being migrated from source logical partition 201 to target logical partition 202. As indicated in FIG. 1, in some scenarios application 106 can be a virtual machine.

Figure 4:
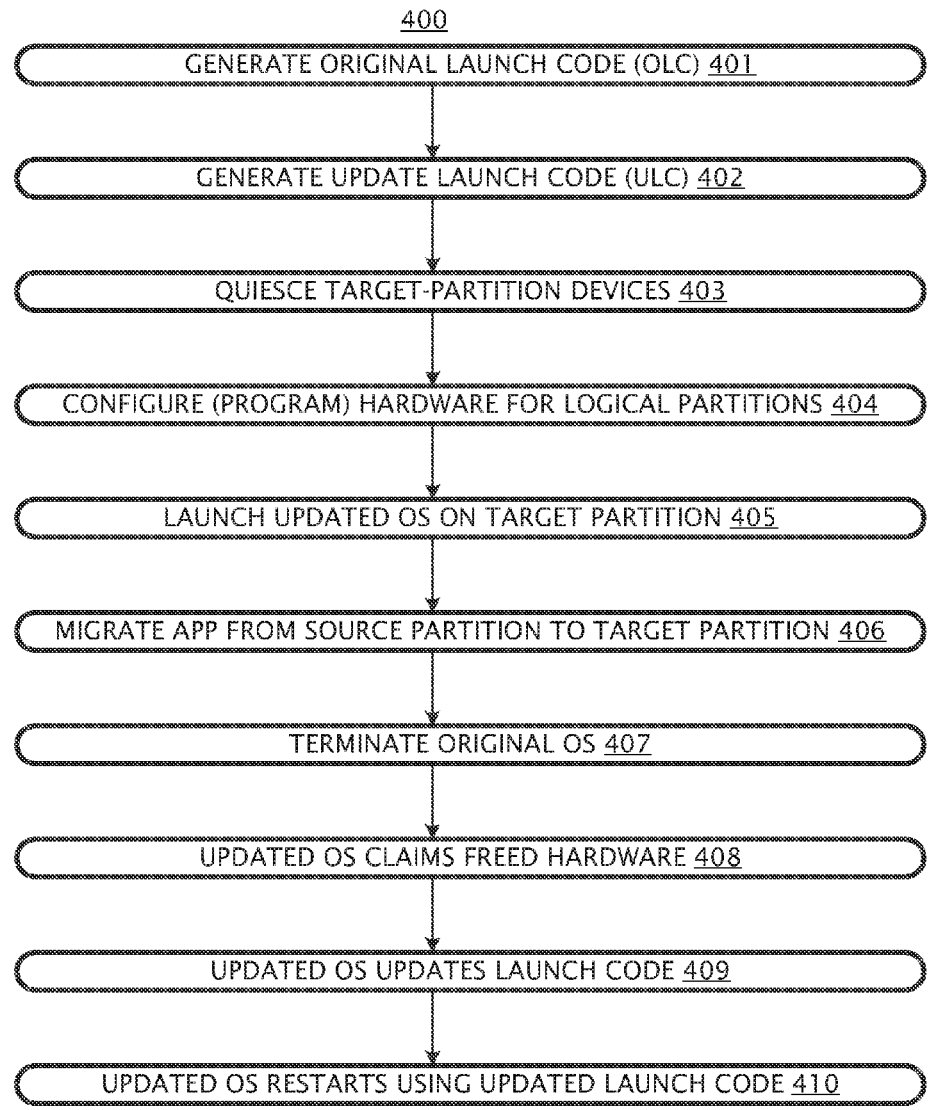
FIG. 4 is a flow chart of the upgrade process that results in the configuration of the computer of FIG. 3.

A process 400 by which an operating system for a computer, such as computer 100, can be updated is flow charted in FIG. 4. At 401, starting from the state represented in FIG. 1, original launch code (OLC) 501 (FIG. 5) is generated, e.g., as computer 100 is powered-ON or hard booted. Process 400 is applicable to computers in the form of servers, standalone computers, laptop computers, tablet computers, smartphones and other computer-based devices and appliances.

During a power-ON or hardware reboot, a multi-stage boot process gathers and generates computer-component data identifying and characterizing hardware and software components of the host computer. The software components identified can include an operating system kernel, device drivers, and applications. The identified hardware devices can include memory devices, processors (CPUs), network interface cards (NICs), and storage controllers (SCs). This computer-component data can be passed from stage to stage and made available to the operating system. In addition to the computer-component data, OLC 501 can include executable code for launching an instance of the original OS.

OLC 501 encapsulates a boot image of the original OS along with associated details so that they can be passed from one bootloader to another. OLC 501 can conform to the Multiboot Specification developed by The Free Software Foundation. CPUs can be identified in OLC 501 in terms of Advanced Programmable Interrupt Controller (APIC) identifiers, while NICs and SCs can be identified using Peripheral Component Interconnect (PCI) identifiers, for example. An operating system can leverage this computer-component data to restore a freshly booted state without going through the multiple boot stages required to generate the computer-component data in the first place. In other words, the computer-component data permits a relatively swift software reboot, obviating a need for a more disruptive hardware reboot.

Figure 5:
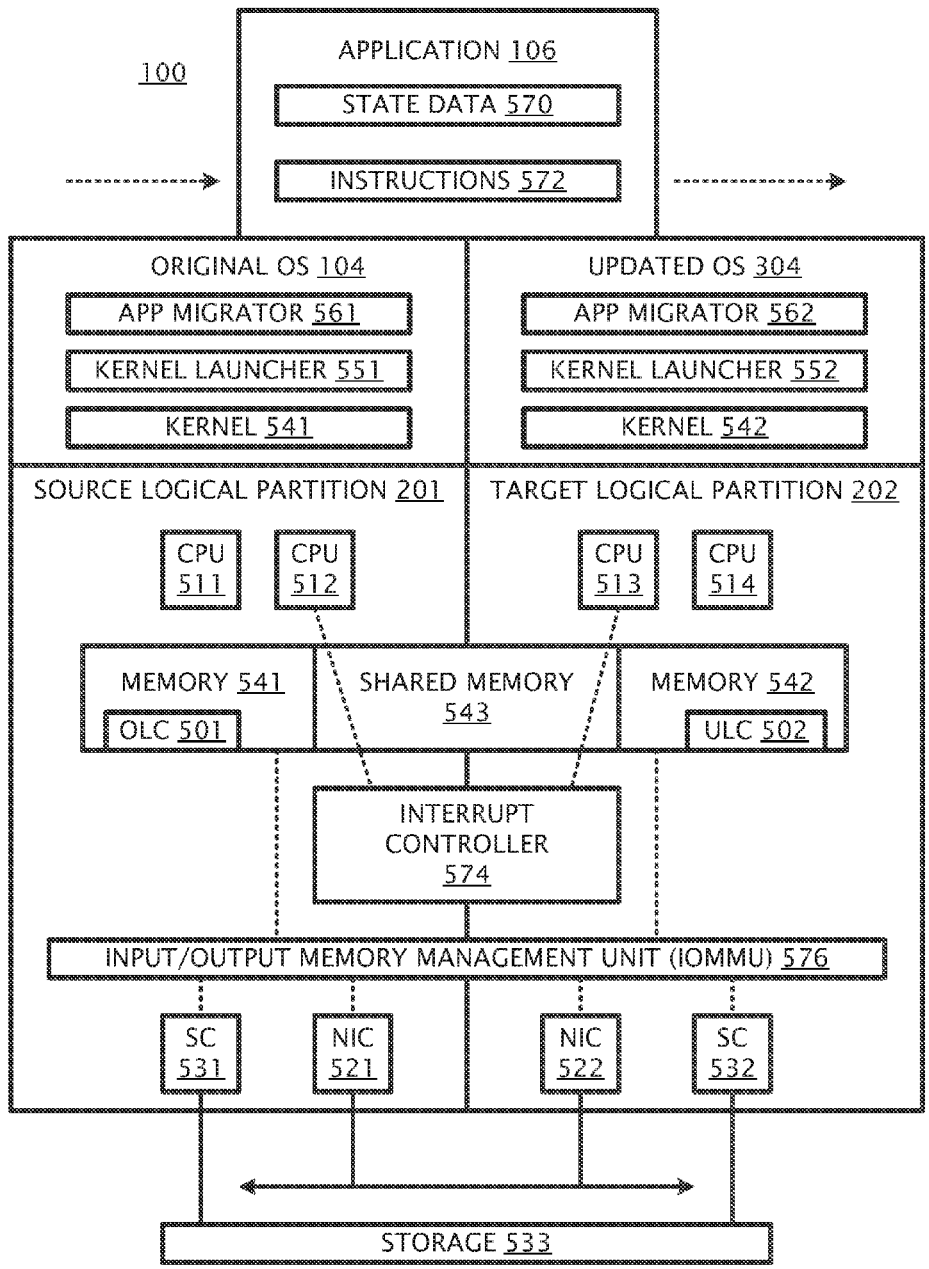
FIG. 5 is a more detailed diagram of the computer of FIG. 1 during the migration of the application represented in FIG. 2.
Figure 6:
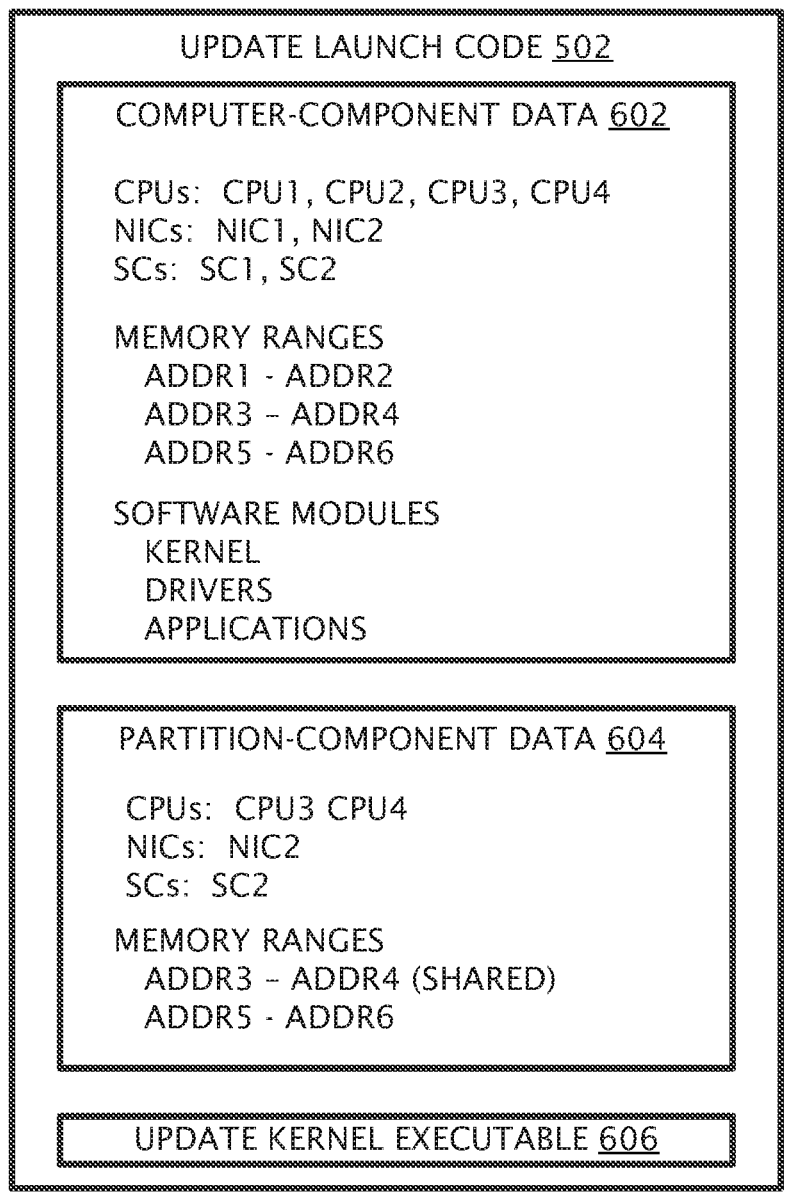
FIG. 6 is a schematic representation of update launch code used in the process of FIG. 4.

At 402 (FIG. 4), original OS instance 104 generates update launch code (ULC) 502 (FIG. 5), e.g., by copying and extending OLC 501. As shown in FIG. 6, ULC 502 can include computer-component data 602, partition-component data 604, and update kernel executable 606. Computer-component data 602 can be the same computer-component data included in OLC 501. Computer-component data 602 includes identifiers CPU1, CPU2, CPU3, and CPU4 respective for CPUs 511, 512, 513, and 514 (FIG. 5). Computer-component data 602 includes identifiers NIC1, NIC2, SC1 and SC2 respectively for NIC 521, NIC 522, SC 531, and SC 532. Computer-component data includes address range identifiers: ADDR1-ADDR2, ADDR3-ADDR4, and ADDR5-ADDR6 respectively for memories 541, 543, and 542. Computer-component data 602 also lists software with which computer 100 is configured, e.g., a kernel, device drivers, and applications. In practice, the CPUs, memory ranges, NICs, and SCs for hardware 102 may be listed in Advanced Configuration and Power Interface (ACK) tables in computer-component data 602.

ULC 502 is extended relative to OLC 501 in that it provides partition-component data 604, identifying which computer devices are to be initially included in a target logical partition in which an updated OS instance is to run. Thus, partition-component data 604 includes identifiers CPU3, CPU4, NIC2 and SC2 respectively identifying CPU 513, CPU 514, NIC 522, and SC 532. Partition-component data also specifies memory ranges ADDR3-ADDR4 and ADDR5-ADDR6 respectively corresponding to memories 543 and 542. A memory range, e.g., ADDR3-ADDR4 may be designated as "shared", indicating that it is to be accessible by both original OS instance 104 and updated OS instance 304; in contrast, address range ADDR5-ADDR6 is to be used exclusively by updated OS instance 304.

More generally, freeing up sufficient memory resources for the target partition and updated OS may be achieved either statically, by reserving memory in the computer-component data (representing unpartitioned hardware) at boot-time to prevent the original OS from using it, or dynamically, by memory reclamation methods in the original OS at run-time, as part of 402. Typically, the devices excluded from the target logical partition would be included in the source logical partition. Once the update ULC 502 is derived, it is stored at a default location, e.g., in the first 4 gigabytes (GB) of space as specified by the Multiboot Specification.

Updated kernel executable 606 includes a boot image of a kernel for the updated OS, along with drivers for accessing portions of the updated OS stored elsewhere, e.g., on network-attached storage (NAS). In another example, an ULC includes a boot image for the entire updated operating system.

At 403 (FIG. 4), original OS instance 104 quiesces target-partition devices to be assigned to target logical partition 202. For example, processes executing on CPUs 513 and 514 are halted or allowed to lapse, as are accesses involving NIC 522 and SC 532. The applications to which the processes belong can continue executing on or be migrated to the remaining still-active CPUs, e.g., CPUs 511 and 512. However, no new workloads are scheduled by original OS instance 104 on the quiesced CPUs.

At 404, hardware 102 is programmed, i.e., configured, to support the logical partitions. For example, NIC 522 can be assigned a new network address, and SC 532 can be programmed with a new virtual World-Wide Name and to access different storage locations. In addition, an Input-Output Memory Management Unit (IOMMU) 576 can be programmed to protect each partition's memory from access by devices associated with the other partition. The source and target partitions share IOMMU 576 to program control for the devices that each side is driving. Other embodiments forego configuring an IOMMU, e.g., some embodiments lack an IOMMU.

Figure 7:
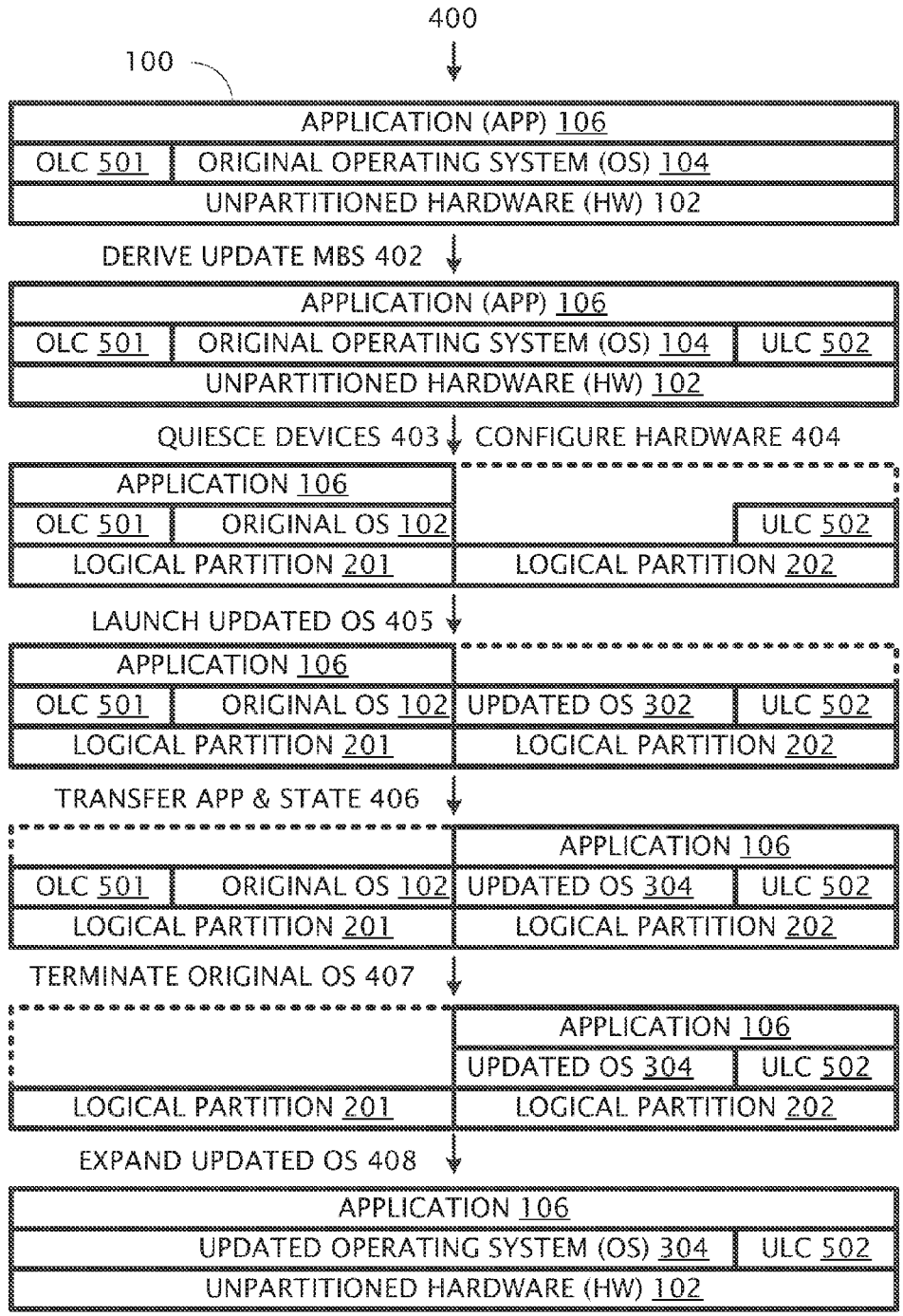
FIG. 7 is a combination flow chart and state diagram of the process of FIG. 4.

In effect, the hardware of computer 100 is partitioned, e.g., to define source logical partition 201 and target logical partition 202 (FIG. 5) so that one partition, e.g., target logical partition 202, conforms to ULC 502. Depending on the embodiment, the ULC can be determined: 1) before the hardware is partitioned, 2) after the hardware is partitioned, or 3) while the hardware is being partitioned. To implement the partitioning, original OS 104 halts processes on devices (e.g., CPUs 513, 514, NIC 522, and SC 532) destined for logical partition 202. The resulting state of system 100 is represented in FIG. 7 as a result of action 403. Original OS instance 104 and application 106 are located in source logical partition 201, while no OS or application is assigned to target logical partition 202 prior to action 405.

For example, storage controllers 531 and 532 are used for accessing storage 533, which can include hard disks and solid-state disks. In computer 100, storage controllers 531 and 532 are normally used in parallel, e.g., to provide greater bandwidth, one of them, e.g., storage controller 532, can be quiesced so that it becomes available for target logical partition 202, while the other, e.g., storage controller 531, can handle the full load during subsequent update steps. Similarly, if NIC 522 normally serves as a backup for NIC 521, then NIC 522 can be relieved of backup duty so that NIC 522 is available for use in target logical partition 202.

At 405 (FIGS. 4 and 7), original OS instance 104 triggers update launch executable 606 (FIG. 6). Accordingly, updated OS instance 304 is launched on target logical partition 202, as indicated in FIG. 7. As shown in FIG. 5, original OS instance 104 includes a kernel 541, a kernel launcher 551, and an application (app) migrator 561. Similarly, updated OS instance 304 includes a kernel 542, a kernel launcher 552, and an app migrator 562. Kernel launchers 551 and 552 roughly correspond to kernel executives used in some contexts to allow soft reboots. In this case, it is "original" kernel launcher 551 that triggers the boot to updated OS instance 304. In an alternative embodiment, original and updated OS instances share a memory-resident kernel launcher. Note that actions 401-405 can be iterated to allow various numbers of OS instances to run on the hardware originally controlled solely by one OS instance.

Figure 8A:
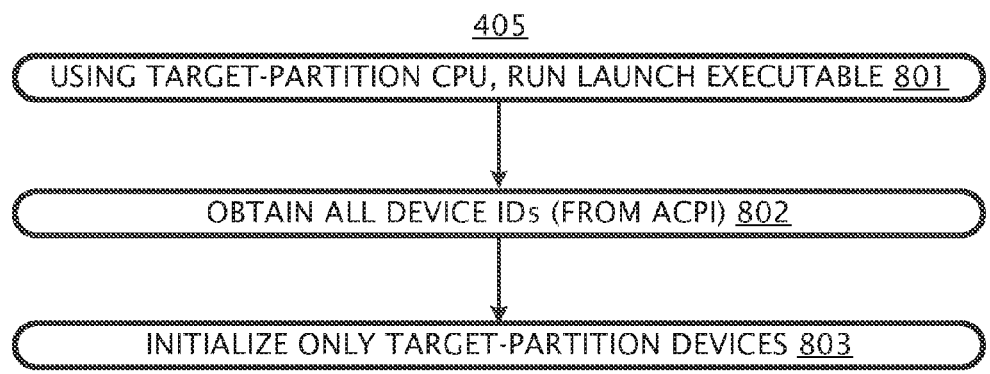
FIG. 8A is a flow chart of sub-actions that can be taken in the course of launching an updated operating system in the process of FIG. 4.

Action 405 is further detailed in FIG. 8A. At 801, launch executable 606 is run using a CPU, e.g., CPU 513, of target logical partition 202. At 802, device identifiers for all CPUs, NICs, and SCs of the computer are obtained, e.g., from computer-component data 602. For example, the device identifiers may be provided in ACPI tables included in update launch code 502. At 803, "updated" kernel 542 initializes devices (other than the launch CPU, which is already initialized) identified in partition-component data 604. Devices listed in computer-component data 602 but not in partition-component data 604 are not initialized at this point; of course they may already be active in the source logical partition. In the illustrated embodiment, the updated instance boots up with network and storage controllers. Additional devices, e.g., keyboard, mouse, video, etc., can be migrated to the updated OS instance once the original OS instance is shutdown.

At 406, original and updated OS instances 104 and 304 cooperate to migrate application 106 from partition 201 to partition 202. More specifically, the respective app migrators 561 and 562 (FIG. 5) cooperate to effect the transfer of application state data 570 from source logical partition 201 to target logical partition 202. The transfer can take place via shared memory 543 and/or over a network via NICs 521 and 522, FIG. 5. An Inter-Processor Interrupt (IPI) can be used to inform the updated OS instance of message arrivals. This migration is represented in FIGS. 2 and 5. Depending on the implementation, the migration may or may not involve an actual transfer of application instructions 572 between partitions.

As an alternative to sending application instructions, a new instance of an application can be installed in target logical partition 202. Transfer of state data 570 between partitions allows the new instance to resume from a state achieved by an application prior to migration. Interruptions are minimized, as the new instance does not have to repeat data-processing steps that led to the halted state to resume from the halted state. The result of the migration is shown in FIG. 7 after action 406.

Hardware may also be transferred from source logical partition 201 to target logical partition 202. For example, in some scenarios, there may be more than one application (e.g., virtual machine) to migrate. As applications are migrated, it may be desirable to reallocate hardware resources between partitions to match the changes in workloads handled by the partitions. Even if there is only one application, hardware may be gradually transferred to the target partition to prepare for an eventual switch of control from the original OS instance to the updated OS instance.

Figure 8B:
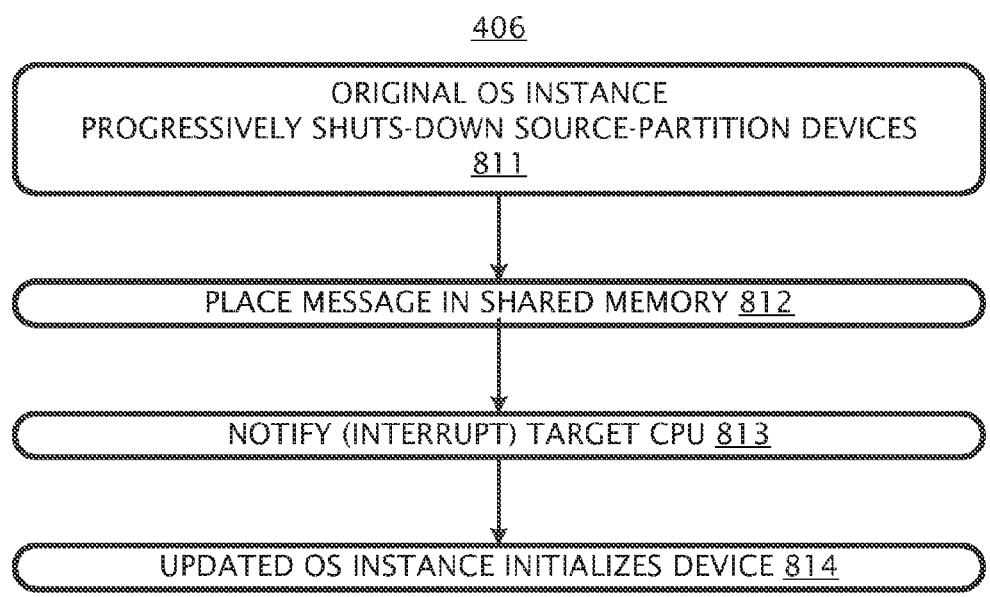
FIG. 8B is a flow chart of sub-actions that can be taken in the course of migrating an application as shown in FIGS. 2 and 5.

Accordingly, the migration of application 106 at action 406 can include progressive migration of hardware from source logical partition 201 to target logical partition 202, as flow charted in FIG. 8B. At 811, the original OS instance 104 can progressively shut down devices. Upon shutting down a device, at 812, original OS instance 104 can post a message in shared memory indicating the availability of the device. This message can identify the device that is now available for re-initialization. At least one CPU can remain active to post the messages just before the last CPU is shut down, it can post a message indicating that it is about to be shutdown. In other words, placing a message at 812 can precede shutting down the corresponding device at 811, at least for the last CPU.

Application migrators 561 and 562 can be modeled after vMotion, a utility available from VMware and used to migrate virtual machines, which are considered, herein, as a special case of applications. Virtual machines can preserve their own states, and application migrators 561 and 562 can migrate applications that preserve their own states or that allow operating systems to track their states. Actual transfer of information can take place using NICs, as it would if a transfer were to a different computer. Alternatively, or in addition, transfer can take place using shared memory 543. The availability of shared memory for communications between partitions can be particularly useful in embodiments in which there is only one NIC, in which case the network connections cannot readily be used for inter-partition communications.

At 813, an IPI directed to a CPU in target logical partition 202 can alert the updated OS instance of the availability of the message. At 814, the updated OS instance can initialize the device identified in the message. In the case of memory, the free memory is simply added to the current free memory. In the case of a CPU, the CPU is added to the list of active CPUs and started as a slave in the target partition. In the case of the last CPU, the message can indicate that a delay may be required before the CPU is available to the target logical partition. For the case of an NIC or SC, the device invokes a hot-plug mechanism in the updated OS instance, in response to which, an appropriate device driver is loaded. During updating, there can be hot-plug events, e.g., as new devices are added to computer 100. Accordingly, at any given stage of process 400, one of the two logical partitions is assigned responsibility for servicing hot-plug events.

At 407 (FIGS. 4 and 7), original kernel launcher 551 (FIG. 5) terminates original OS instance 104, freeing the devices assigned to source logical partition 201. The result of the termination is shown in FIG. 7. At 408, updated OS instance 304 claims for its own use the resources formerly assigned to logical partition 201. For example, NIC 521 can serve as an active standby for NIC 522, and storage controller 531 can be operated in parallel with storage controller 532. Note that computer-component data 602 identifies all devices of hardware. 102, so update OS instance 304 can determine what devices are available once original OS 102 terminates. The result of action 408 is shown in FIG. 7 (which corresponds to FIG. 3). Process 400 can be iterated any number of times in succession without a reboot, e.g., to implement successive updates over time.

Once updated OS instance 304 claims hardware at 408, updated launch code 502 is no longer current. Accordingly, updated. OS instance 304 updates ULC 502 at action 409 to correspond to the current hardware configuration of computer 102. The configuration of computer 100 may be the same as it was when original OS instance. 104 was in control, or the configuration may have changed. For example, devices can have been hot-swapped in and/or out of computer 100 during process 400. Once OLC 502 has been updated, it can be used for a soft boot, i.e., relaunch, at 410, of updated OS instance 304 without a hardware reboot. In some embodiments, the ULC is not updated, so that update process ends at action 408.

Hardware 102 includes only one interrupt controller 574, shown in FIG. 5, which cannot be divided readily among logical partitions. Interrupt controller 574 can be, for example, an "IOAPIC" (Input/Output Advanced Programmable Interrupt Controller) interrupt controller as provided for x86 systems (available from Intel Corporation). Instead, original OS instance 104 and updated OS instance 304 must share interrupt controller 574. Interrupt controller 574 can redirect interrupts from a CPU in source logical partition 201 to a CPU in target logical partition 202. Likewise, original OS instance 104 and updated OS instance 304 share IOMMU 576. Access controls, e.g., semaphores, in shared memory can be used to prevent conflicting accesses, e.g., violations of transactions designed to be atomic (i.e., indivisible). In alternative embodiments, each partition has its own interrupt controller and/or IOMMU.

Figure 9A:
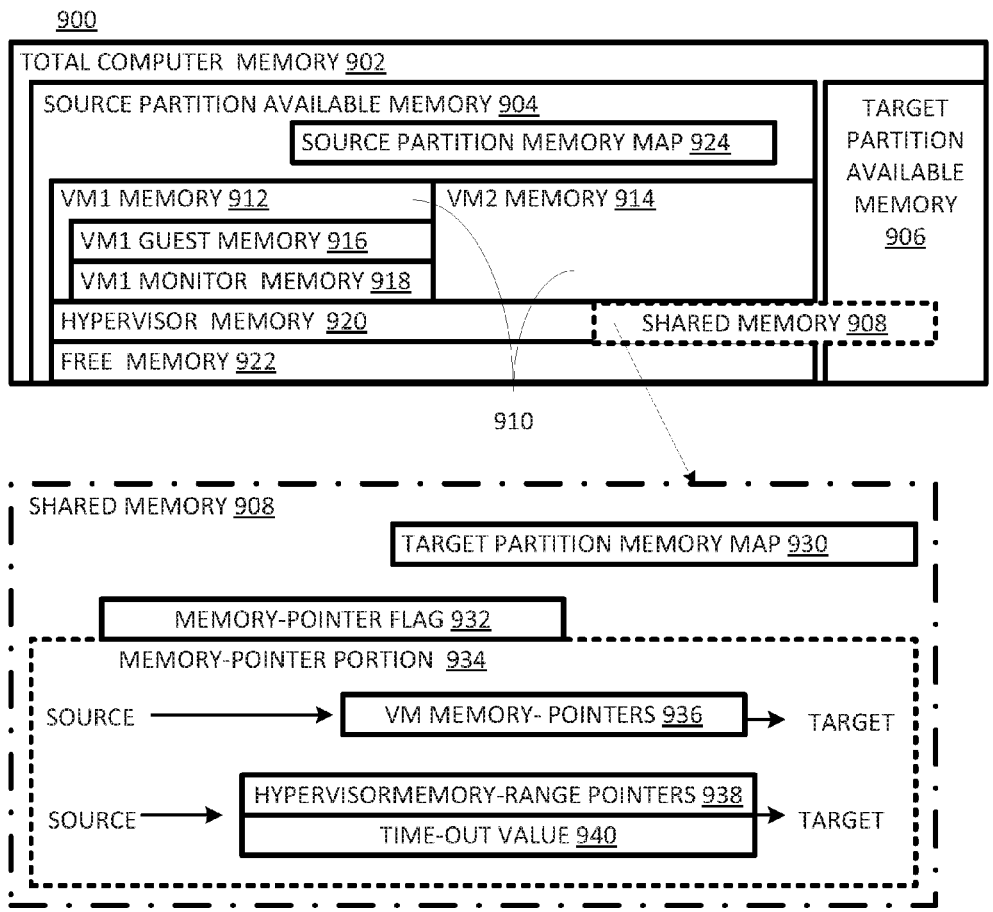
FIG. 9A is a schematic diagram of a memory structure for a computer machine.

Various portions of memory can be logically transferred at different points in the OS update process, depending on the entity to which the portion is allocated. As shown in FIG. 9A, a memory structure 900 for the computer, e.g., computer 100, FIG. 5, includes total computer memory 902 partitioned between a source partition available memory 904, target partition available memory 906, and shared memory 908.

Source partition available memory 904 includes virtual-machine (VM) memory 910, which includes virtual-machine memory allocated for use by each virtual machine including a guest operating system and any application(s) running thereon. Virtual-machine memory is allocated to each virtual machine. For example, a virtual machine VM1 includes virtual-machine memory 912, while a virtual machine VM2 includes virtual-machine memory 914. Each virtual-machine's memory includes guest memory and monitor memory. For example, virtual machine memory 912 includes guest memory 916 and monitor memory 918. Virtual-machine memory typically constitutes the bulk of the total memory. VM2 memory 910 and the memory for other virtual machines are structured similarly. Source partition available memory 904 also includes hypervisor memory 920 and free memory 922. In addition, both source partition P1 and target partition P2 can access shared memory 920.

A source-partition memory map 924 of the memory structure 900 is stored in source-partition available memory 904. The old hypervisor stores a version of map 924, i.e., a target-partition memory map 930, in shared memory for use by the new hypervisor as it is launched. During partitioning, the old hypervisor creates and sets a memory-pointer flag 932 that, when set, precludes the new hypervisor from reading a memory-pointer portion 934 of shared memory. During virtual-machine migration, the old hypervisor writes virtual-machine memory pointers 936 to memory-pointer portion 934, and unsets the memory-pointer flag 932. The new hypervisor then reads the memory pointers and (re)sets the memory-pointer flag. To transfer a last processor and hypervisor memory, the old hypervisor writes hypervisor memory pointers 938 to the memory-pointer portion along with a time-out value 940 and unsets memory-pointer flag 932. The new hypervisor sets a timer according to the time-out value, and, when the timer expires, claims the hypervisor memory and a last processor used by the old hypervisor to complete the hypervisor upgrade/exchange.

Figure 9B:
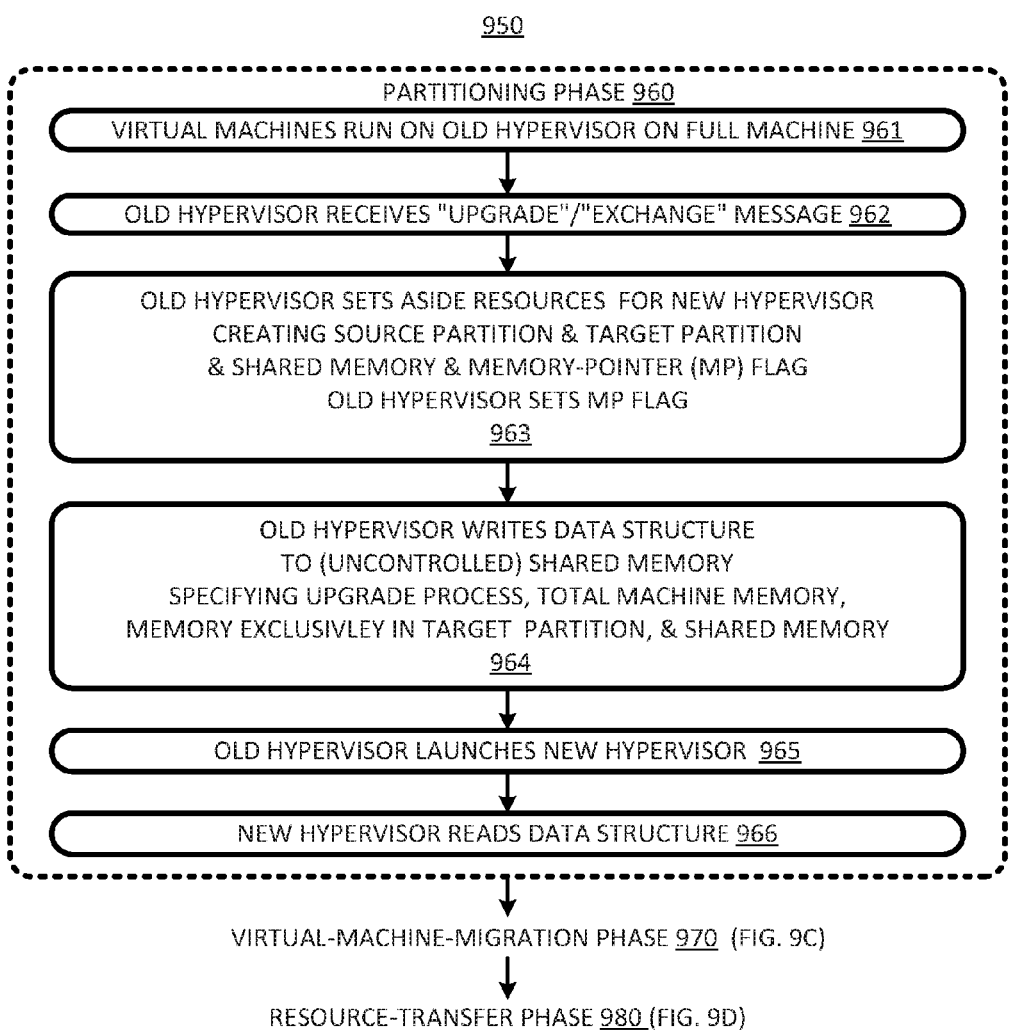
FIG. 9B is a flow chart of a hypervisor-exchange process for the computer machine of FIG. 9A that emphasizes a partitioning phase of the process.
Figure 9C:
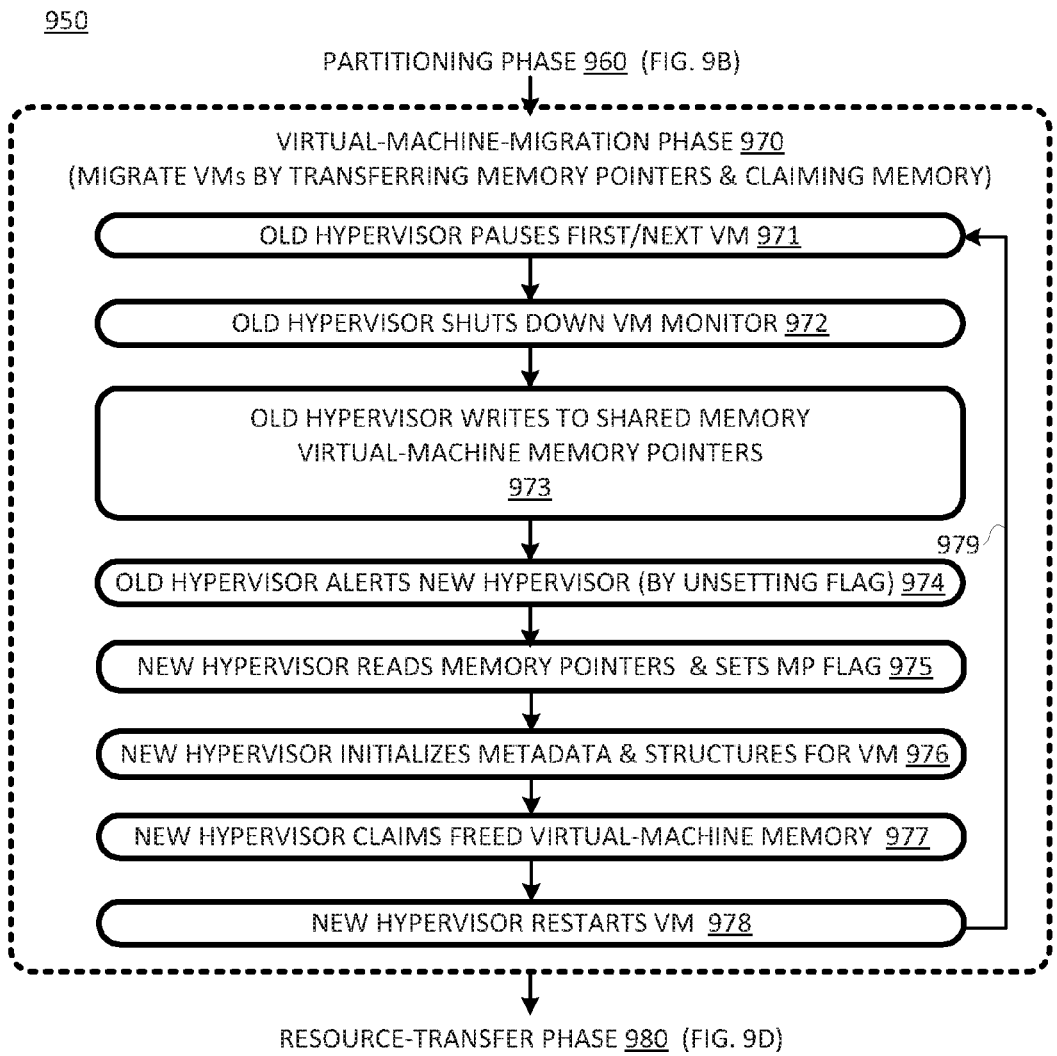
FIG. 9C is a flow chart of the hypervisor-exchange process of FIG. 9B that emphasizes a virtual-machine migration phase of the process.
Figure 9D:
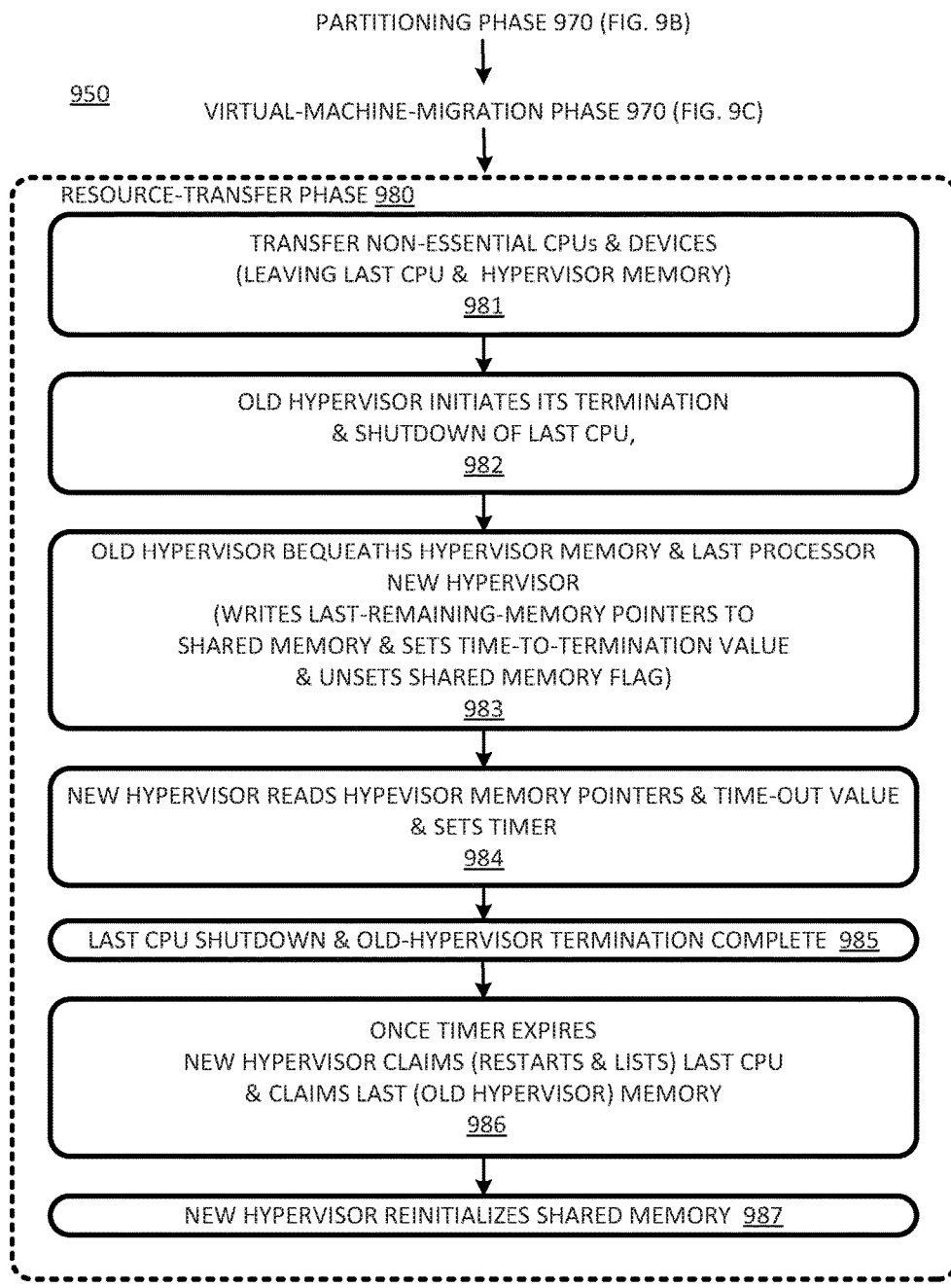
FIG. 9D is a flow chart of the hypervisor-exchange process of FIG. 9C that emphasizes a resource-transfer phase of the process.

As shown in FIGS. 9B-9D, a process 950 for upgrading a hypervisor or otherwise exchanging hypervisors includes a partitioning phase 960, a virtual-machine-migration phase 970, and a resource-transfer phase 980. In partitioning phase 960, a host machine is partitioned to form a source partition P1 and a target partition P2. Initially, the source partition P1 hosts an "old" hypervisor, which, in turn, hosts virtual machines. The target partition hosts a "new" hypervisor, which may be an upgraded version of the old hypervisor. In virtual-machine migration phase 970, the virtual machines are migrated from the old hypervisor in the source partition to the new hypervisor in the target partition. Rather than physically moving the virtual-machine data, the old hypervisor informs the new hypervisor of the memory locations of the virtual-machine data, and the new hypervisor simply claims those memory locations to effect the migration. In resource-transfer phase 980, resources (processors, memory, and other devices) are transferred from the source partition to the target partition. The last processor and memory to be transferred are "bequeathed" by the old hypervisor to the new hypervisor, which claims the last processor and memory only after time-out period has expired and the old hypervisor is terminated.

As best seen in FIG. 9B, partitioning phase 960 begins, at 961, with virtual machines running on an old hypervisor, which controls the entire host computer. At 962, the old hypervisor receives an instruction for an upgrade or other hypervisor exchange. At 963, the old hypervisor relinquishes (aka, "sets aside") computer resources for hosting a new hypervisor. The effect is to divide the host machine into a source partition hosting the old hypervisor and the virtual machines, on the one hand, and an empty target petition, on the other. The old hypervisor sets a shared-memory flag that serves to prevent the new hypervisor from reading a memory-pointer portion of shared memory.

At 964, the old hypervisor writes a memory map, e.g., of the memory structure in FIG. 9A, along with other information regarding the in-progress upgrade/exchange and the virtual-machines to be migrated. The memory map identifies the total computer memory, the memory exclusively available to each partition, and the shared memory. The memory map can be written to a portion of shared memory not controlled by the flag so that the new hypervisor can access it as it is launched by the old hypervisor at 965. At 966, the new hypervisor reads the memory map as partitioning phase 960 finishes. At this point, the old hypervisor is hosting all the virtual machines and the new hypervisor is hosting none.

Partitioning phase 960 is followed by virtual-machine-migration phase 970, shown in detail in FIG. 9C. In the illustrated embodiment, the virtual machines are transferred one at a time. In an alternative embodiment, the virtual machines are consolidated so that they can be migrated all at once or in batches as taught in related patent application Ser. No. 15/189,108 filed 2016 Jun. 22. An iterative procedure begins with the old hypervisor pausing, at 971, a first virtual machine (in a first iteration) and a "next" virtual machine in succeeding iterations. At 972, the old hypervisor shuts down the virtual-machine monitor associated with the paused virtual machine.

At 973, the old hypervisor writes, to shared memory, virtual-machine memory pointers (e.g., page addresses) identifying the respective virtual-machine memory locations. At 974, the old hypervisor alerts the new hypervisor that there are memory pointers in shared memory for it to read. In the illustrated embodiment, the memory pointers are stored in the memory-pointer portion of shared memory and the alert is implemented by unsetting the memory-pointer flag (which is polled by the new hypervisor). In another variation, the old hypervisor can use a network connection between the partitions for the alert. In a further variation, the old hypervisor can use an interprocessor interrupt for the alert. In any variation, the new hypervisor reads the memory pointers to determine the memory locations associated with the first/next virtual machine.

At 975, the new hypervisor reads the memory pointers from shared virtual-memory and sets the memory-pointer flag. At 976, the new hypervisor initializes metadata and structures for the virtual machine. At 977, the new hypervisor claims the memory referred to by the pointers. The memory map transferred during partitioning phase 960 is updated since the partitions resize as each virtual-machine is migrated. At 978, the new hypervisor restarts the newly migrated and formerly paused virtual machine. Phase 970 then returns to pause the next virtual machine, as indicated by arrow 979. In the event there is no next virtual machine, process 950 continues with resource-transfer phase 980.

At the beginning of resource-transfer phase 980, all virtual-machines reside on the new hypervisor. It should be noted that during migration phase 970, some devices, e.g., processors, may be transferred from the source partition to the target partition to keep up with the increasing workload of the target partition as virtual machines are migrated to it. However, once all the virtual-machines have been migrated, in the event there are resources that are not essential to the old hypervisor, they can be transferred to the target partition at 981. Thus, at the end of 981, the only resources remaining in the source partition are those required for the old hypervisor to finish its role the in hypervisor upgrade/exchange. At a minimum, the remaining devices would include a processor and some "hypervisor" memory.

At 982, the old hypervisor initiates its own termination and initiates shutdown of the last processor. At 983, the old hypervisor bequeaths the last remaining memory and last processor to the new hypervisor. Herein, "bequeath" refers to a release and grant of resources that is to take effect after the termination of the entity doing the bequeathing. In this case, the old hypervisor writes hypervisor memory pointers to the memory-pointer portion of shared memory, which is controlled by the shared memory flag. Also written to memory-pointer portion of shared memory is a time-out value corresponding to the time termination of the old hypervisor and shutdown of the last processor is expected to be complete in addition, the old hypervisor unsets the memory-pointer flag so that the new hypervisor can read the memory pointers. If the new hypervisor polls for the flag, then the unset flag serves as an alert to the new hypervisor that it should read the memory-pointer portion of shared memory. In an alternative embodiment, termination is initiated after the hypervisor memory is bequeathed.

At 984, the new hypervisor reads the hypervisor memory pointers and the time-out value. At 985, the last processor shuts down, completing termination of the old hypervisor. At 986, the tinier set at 983 times out, so the new hypervisor claims the last (old-hypervisor) memory and claims (restarts and lists) the last processor. At 987, the new hypervisor reinitializes shared memory so that it belongs solely to the new hypervisor. This completes the upgrade/exchange. Note that process 950 can be encoded media and executed using a processor.

Herein, "system" refers to an interacting set of elements, wherein the elements may include, for example, computer components, atoms, and/or process actions. Herein, "process" refers to a system that involves or results in a physical transformation and in which the interacting elements include actions.

Herein, a "computer" is a machine including: 1) storage media for storing data and instructions for manipulating data; 2) a processor for manipulating data according to the instructions; and 3) communications devices for inputting and outputting data. Herein, "partition" refers to a division of a host computer that itself qualifies as a computer but includes less than all components of the host computer. Typically, a partition is one of plural divisions of a computer, wherein each division can execute a respective instance of an operating system. Hardware partitions are defined in hardware and are electrically isolated from each other. Logical partitions are defined in software and are not electrically isolated from each other. At any given time, hardware may be dedicated to a logical partition or shared among logical partitions.

Herein, "device" refers to a hardware component of a computer. Herein, "storage media" refers to non-transitory tangible devices or systems in or on which information can be physically encoded. Examples of storage media include hard disks, solid-state disks, and memory. "Memory" refers to storage media that is directly addressable. "Memory" encompasses both volatile memory, e.g., Dynamic Random Access Memory (DRAM), and non-volatile memory, e.g., flash memory and Read-Only Memory (ROM).

Herein, "processor" and "central processing unit" (CPU) refer to a device, collection of devices, or hardware component of a device for executing program instructions. For example, a CPU or processor may be an integrated circuit, a portion (e.g., core) of an integrated circuit, or a collection of integrated circuits.

Herein, an "Input-Output Memory Management Unit" or "IOMMU" is a memory management unit (MMU) that connects a direct memory access-capable (DMA-capable) I/O bus to the main memory. An IOMMU 576 maps device-visible virtual addresses (also called device addresses or I/O addresses in this context) to physical addresses.

Herein, "program" refers to an ordered set of computer-executable instructions that, when encoded in storage media, defines a functional relationship among hardware elements of a computer. Operating systems, drivers, and applications are examples of programs. There can be multiple identical or similar, but separately encoded, instances of a program, e.g., instances of Microsoft Word can run on different computers.

Herein, "operating system" refers to a program designed to control hardware and to serve as an interface between an application program and the hardware. Herein, the terms "application program" and "application" refer broadly to any program that accesses hardware via an operating system. "Application", as used herein, encompasses programs, such as Microsoft Word, conventionally regarded as applications, but also encompasses virtual machines (e.g. running on a hypervisor, i.e., a virtualizing operating system), and process containers. An operating system executing in a virtual machine can be referred to herein as a "guest operating system", while an operating system that interfaces directly (as opposed to via another operating system) with hardware is referred to herein as a "bare-metal" operating system.

Herein, "launching" refers to a process of converting something, e.g., a program instance, from an inactive or dormant state to an active state. "Terminating" is a process of converting something, e.g., an operating system instance, from an active state to an inactive or dormant state. "Quiescing" refers to allowing hardware to halt processing, e.g., by withholding processes from the hardware. Herein, an "interrupt" is a message to a processor that causes the processor to interrupt one process to attend to another.

Herein, "migrating" refers to transferring e functionality of a program, e.g., an application, from one computer or partition to another computer or partition. A migration can involve sending of program instructions between computers or partitions; alternatively or in addition, migration can involve sending program state information from one instance of a program executing in a first computer/partition to a second instance of a program executing in a second computer/partition.

Herein, the terms "original" and "updated", as applied to operating-system instances, are defined relative to each other. The original OS instance is the instance replaced, while the updated OS instance is the instance that replaces the original operating-system instance. The updated OS instance may be an instance of the same or of a different operating system than the operating system of which the original OS instance is an instance. The updated OS instance may be older or newer than the original OS instance.

Likewise, "old", as used herein, refers to a hypervisor/OS that is to be replaced, while "new" refers to a hypervisor/OS that is to replace an old hypervisor/OS. If the hypervisor or OS exchange is to be an upgrade, the old hypervisor/OS is the older version and the new hypervisor/OS is the newer version. However, even if the exchange is a reversion or downgrade, "old" and "new" refer respectively to the hypervisor/OS to be replaced and the hypervisor/OS that replaces it, "Source" and "target" herein respectively refer to: 1) a partition from which virtual machines or other programs are migrated; and 2) a partition to which virtual machines or other programs are migrated.

Herein, "boot" refers to a process of initializing a computer. For example, when a computer is powered ON, the computer can conduct a series of power ON self tests (POSTs) to ensure proper functioning of devices. A "reboot" involves restarting a computer from a power ON state. Reboots can be either hard (aka cold), in which case the power to the system is physically turned off and back on again, triggering POSTs. Alternatively, a reboot can be soft (aka warm) where the system restarts without the need to interrupt the power or conduct POSTs. Booting is complete when the normal, operative, runtime environment is attained. A "boot loader" is a computer program that loads an operating system or some other system software for the computer after completion of the POSTs; it is the loader for the operating system itself, which has its own loader for loading ordinary user programs and libraries.

Herein, "hot swap" refers to a process in which one computer component is replaced by another computer component without shutting the host computer down. Conventionally, the term is applied to hardware components, e.g., hard disks. Herein, the term is extended to cover operating systems as the processes disclosed herein permit replacement or update of an operating system instance while avoiding the hardware shutdown typically required to replace or update an operating system instance.

In the illustrated embodiments, the virtual-machine memory pointers and the hypervisor memory pointers are transferred via the flag-controlled area of shared memory. In this case, the new hypervisor monitors the flag so unsettling the flag serves as an alert to the new hypervisor of the presence of memory pointers that need to be read. In an alternative embodiment, the flag-controlled area of shared memory is used to transfer the hypervisor memory but not the virtual-machine memory. Instead, the virtual-machine memory is transferred via an area of shared memory not controlled by the memory-pointer flag. The old hypervisor can alert the new hypervisor of the presence of virtual-machine memory pointers via an inter-processor interrupt, or a message sent over a network connection, or otherwise. In an alternative embodiment, some or all memory pointers are transferred over a network connection. In the illustrated embodiment, a hypervisor is being updated. In alternative embodiments, an operating system other than a hypervisor is upgraded or exchanged using a process in which containers or other programs are migrated.

In accordance with the foregoing, hypervisor upgrades and other operating-system exchanges can be performed faster, with little or no impact on network bandwidth, and without requiring a standby machine to host virtual machines. Herein, art labelled "prior art", if any, is admitted prior art; art not labelled "prior art" is not admitted prior art. The described embodiments, as well as variations upon and modifications to those embodiments are within the scope of the present invention, which is defined by the following claims.

What is claimed is:

1. An operating-system (OS) exchange process comprising:
   executing a program set of at least one program on an old OS executing on a computer, the computer allocating respective memory ranges to each program of the program set;
   partitioning the computer to create a source partition and a target partition, each partition having at least one processor, the program set and the old OS executing on the source partition, the partitioning including installing and executing a new OS on the target partition;
   migrating the program set from the old OS to the new OS at least in part by,
      sending, by the old OS to the new OS via a shared memory, program memory pointers to locations in the source partition allocated to the program set, the shared memory being accessible by the old OS and the new OS, and
      claiming, by the new OS, memory referred to by the program memory pointers so that the locations are then within the target partition;

transferring resources from the source partition to the target partition and terminating the old OS, the transferring including,
    the old OS bequeathing, by the old OS, last-remaining old OS memory and a processor to the new OS, the bequeathing including writing a time-out value and last-remaining memory pointers of the program memory pointers to the shared memory, the time-out value corresponding to a time by which the old OS will have been shut down,
    reading, by the new OS, the time-out value and the last-remaining memory pointers,
    setting, by the new OS, a timer according to the time-out value, and
    once the timer has expired and the old OS has been terminated, claiming, by the new OS, the last remaining old OS memory.

2. The OS exchange process of claim 1 wherein the old OS is an old hypervisor, the new OS is a new hypervisor, the program set is a virtual-machine set, and each program of the program set is a virtual machine, the transferring further including, once the timer has expired and the old hypervisor has been terminated, claiming, by the new hypervisor, a last CPU used by the old hypervisor.

3. The OS exchange process of claim 2 wherein the program memory pointers are virtual-machine memory pointers referring to memory locations associated with respective virtual machines and their respective virtual-machine monitors, the transferring further including, once the timer has expired and the old hypervisor has been terminated, reinitializing, by the new hypervisor, the shared memory.

4. The OS exchange process of claim 3 wherein the migrating further includes:
    prior to the sending, pausing, by the old hypervisor, a first virtual machine, and shutting down a VM monitor associated with the first virtual machine; and
    after the sending, initializing metadata and structures for the first virtual machine; and
    restarting, by the new hypervisor, the first virtual machine.

5. The OS exchange process of claim 4 wherein the partitioning includes defining the shared memory to be shared by the old hypervisor and the new hypervisor, the shared memory including a memory-pointer portion, the partitioning further including creating a memory-pointer flag that, when set, precludes the new hypervisor from reading from the memory-pointer portion of the shared memory.

6. The OS exchange process of claim 5 wherein the migrating further includes:
    unsetting, by the old hypervisor, the memory-pointer flag so that the new hypervisor can read memory pointers from the memory-pointer portion of the shared memory; and
    setting, by the new hypervisor, the memory pointer flag after the memory pointers from the memory-pointer portion of the shared memory are read by the new hypervisor.

7. The OS exchange process of claim 5 wherein the partitioning further includes passing, by the old hypervisor to the new hypervisor, a memory map specifying memory locations for the computer in its entirety, the map identifying memory locations to be exclusively available to the new hypervisor as well as locations of the shared memory.

8. The OS exchange process of claim 2 wherein the partitioning includes defining the shared memory to be accessible by both the old hypervisor and the new hypervisor, defining a memory-pointer flag that, when set, precludes the new hypervisor from reading from a memory-pointer portion of the shared memory to which the program memory pointers are written, the old hypervisor unsetting the memory-pointer flag upon writing the program memory pointers to the memory-pointer portion of the shared memory.

9. An operating-system (OS) exchange system comprising non-transitory media encoded with code that, when executed by a processor, implements a process including:
    executing a program set of at least one program on an old OS executing on a computer system, the computer system allocating respective memory ranges to each program of the program set;
    partitioning the computer system to create a source partition and a target partition, each partition having at least one processor, the program set and the old OS executing on the source partition, the partitioning including installing and executing a new OS on the target partition;
    migrating the program set from the old OS to the new OS at least in part by,
        sending, by the old OS to the new OS via a shared memory, program memory pointers to locations in the source partition allocated to the program set, the shared memory being accessible by the old OS and the new OS, and
        claiming, by the new OS, memory referred to by the program memory pointers so that the locations are then within the target partition;
    transferring resources from the source partition to the target partition and terminating the old OS, the transferring including,
        bequeathing, by the old OS, last-remaining old OS memory and a processor to the new OS, the bequeathing including writing a time-out value and last-remaining memory pointers of the program memory pointers to the shared memory, the time-out value corresponding to a time by which the old OS will have been shut down,
        reading, by the new OS, the time-out value and the last-remaining memory pointers,
        setting, by the new OS, a timer according to the time-out value, and
        once the timer has expired and the old OS has been terminated, claiming, by the new OS, the last remaining old OS memory.

10. The OS exchange system of claim 9 wherein the old OS is an old hypervisor, the new OS is a new hypervisor, the program set is a virtual-machine set, and each program of the program set is a virtual machine, the transferring further including, once the timer has expired and the old hypervisor has been terminated, claiming, by the new hypervisor, a last CPU used by the old hypervisor.

11. The OS exchange system of claim 10 wherein the program memory pointers are virtual-machine memory pointers referring to memory locations associated with respective virtual machines and their respective virtual-machine monitors, the transferring further including, once the timer has expired and the old hypervisor has been terminated, reinitializing, by the new hypervisor, the shared memory.

12. The OS exchange system of claim 11 wherein the migrating further includes:

prior to the sending, pausing, by the old hypervisor, a first virtual machine, and shutting down a VM monitor associated with the first virtual machine; and after the sending, initializing metadata and structures for the first virtual machine, and restarting, by the new hypervisor, the first virtual machine.

13. The OS exchange system of claim 12 wherein the partitioning includes defining the shared memory to be shared by the old hypervisor and the new hypervisor, the shared memory including a memory-pointer portion, the partitioning further including creating a memory-pointer flag that, when set, precludes the new hypervisor from reading from the memory-pointer portion of the shared memory.

14. The OS exchange process of claim 13 wherein the migrating further includes:

unsetting, by the old hypervisor, the memory-pointer flag so that the new hypervisor can read memory pointers from the memory-pointer portion of the shared memory; and setting, by the new hypervisor, the memory pointer flag after the memory pointers from the memory-pointer portion of the shared memory are read by the new hypervisor.

15. The OS exchange system of claim 13 wherein the partitioning further includes passing, by the old hypervisor to the new hypervisor, a memory map specifying memory locations for the computer in its entirety, the map identifying memory locations to be exclusively available to the new hypervisor, and locations of the shared memory.

16. The OS exchange system of claim 10 wherein the partitioning includes defining the shared memory to be accessible by both the old hypervisor and the new hypervisor, defining a memory-pointer flag that, when set, precludes the new hypervisor from reading from a memory-pointer portion of the shared memory to which the program memory pointers are written, the old hypervisor unsetting the memory-pointer flag upon writing the program memory pointers to the memory-pointer portion of the shared memory.

\* \* \* \* \*